US009694860B2

(12) United States Patent
Ballard

(10) Patent No.: US 9,694,860 B2
(45) Date of Patent: Jul. 4, 2017

(54) SYSTEM AND METHOD FOR TRAILER ATTACHMENT

(71) Applicant: RKB Enterprises, LLC, Elgin, TX (US)

(72) Inventor: Randy K. Ballard, Elgin, TX (US)

(73) Assignee: RKB Enterprises, LLC, Elgin, TX (US)

( * ) Notice: Subject to any disclaimer, the term of this patent is extended or adjusted under 35 U.S.C. 154(b) by 0 days.

(21) Appl. No.: 14/836,409

(22) Filed: Aug. 26, 2015

(65) Prior Publication Data

US 2017/0057569 A1 Mar. 2, 2017

(51) Int. Cl.

*B62D 53/08* (2006.01)
*B62D 53/12* (2006.01)
*B23K 31/02* (2006.01)
*B62D 65/00* (2006.01)

(52) U.S. Cl.

CPC .............. *B62D 53/12* (2013.01); *B23K 31/02* (2013.01); *B62D 65/00* (2013.01)

(58) Field of Classification Search

CPC ...... B62D 53/0828; B62D 53/00; B60D 1/54; B60D 2001/544; B60D 1/015
USPC ........................ 280/433, 491.1, 491.3, 418.1
See application file for complete search history.

(56) References Cited

U.S. PATENT DOCUMENTS 2,925,286 A * 2/1960 Hodges, Jr. ........ B62D 53/0828 280/423.1
5,346,240 A * 9/1994 Pettit ........................ B60D 1/54 280/438.1
6,485,045 B1 * 11/2002 King ...................... B60D 1/065 280/417.1
7,726,678 B1 * 6/2010 Connell ............ B62D 53/0814 280/433
8,434,779 B2 * 5/2013 Roth-Schuler ......... B62D 53/08 280/433
8,439,387 B1 * 5/2013 Connell ................. B62D 53/08 280/438.1

* cited by examiner

*Primary Examiner* — Anne Marie Boehler
(74) *Attorney, Agent, or Firm* — Hulsey, P.C.

(57) ABSTRACT

The disclosure provides a system and method for trailer attachment.

8 Claims, 8 Drawing Sheets

225

170

SYSTEM AND METHOD FOR TRAILER ATTACHMENT

CROSS-REFERENCE TO RELATED APPLICATIONS

N/A

FIELD OF THE INVENTION

This disclosure relates in general to a system and method for trailer attachment. More particularly, the disclosure relates to a system for connecting a trailer vehicle to a towing vehicle.

BACKGROUND

The disclosed subject matter provides a system and method for trailer attachment. The system may include a fifth wheel hitch that may, when utilized in the method, allow a trailer to be affixed within the bed of a towing vehicle.

BRIEF SUMMARY OF THE INVENTION

The present disclosure provides a system and method for trailer attachment. The system may comprise a substantially rectangular frame structure comprising a closed bottom interior section, wherein the frame structure may be affixed to at least a portion of a towing vehicle frame. At least two shelving elements may be affixed to at least two interior walls. The at least two shelving elements may be spaced a distance from the bottom of the interior section and may each comprise at least one orifice.

The system may further comprise at least two upper retaining elements that may be affixed to at least two interior walls. The at least two upper retaining elements may be spaced a distance from the shelving elements. The upper retaining elements may each comprise at least one orifice. A platform comprising a top surface and a bottom surface may be at least partially encompassed within the open interior space of the at least two shelving elements. At least two receiver elements may be affixed to the platform and may comprise a hollow interior portion.

The system may further comprise a hitch base portion that may be pivotable about a pivot axis. The pivot axis may be retained within a portion of each of the receiver elements and the hitch base portion. A fifth wheel hitch may be welded to the hitch base portion. A lock bar may be slidably engageable within the distance between the shelving elements and the upper retaining elements, wherein the lock bar may comprise at least two orifices. A plurality of locking elements may be partially encompassed within the orifices of the shelving elements, the upper retaining elements, and the orifices of the lock bar.

The present disclosure may further comprise a method for affixing a trailer to a hitch when the hitch is stowed away in the bed of a truck. The method may comprise opening a trap door affixed to a bed of a truck. At least one of a plurality of locking elements may be removed from at least one of a plurality of orifices found in shelving elements, upper retaining elements, and a lock bar. The lock bar may then be slid to an open position.

The method may further comprise lifting a fifth wheel hitch welded to a hitch base portion to an upright position. The lock bar may then be slid to a closed position. The plurality of locking elements may be inserted into the orifices found in the shelving elements, the upper retaining elements, and the lock bar. A trailer kingpin may then be inserted into the fifth wheel hitch.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features, and advantages here provided will become apparent to one with skill in the art upon examination of the following FIGURES and detailed description. It is intended that all such additional systems, methods, features, and advantages that are included within this description, be within the scope of the appended claims and/or those claims filed later.

BRIEF DESCRIPTIONS OF THE DRAWINGS

The novel features believed characteristic of the presently disclosed subject matter are set forth in the claims appended hereto or will be set forth in any claims that are filed herewith or later. The presently disclosed subject matter itself, however, as well as a preferred mode of use, further objectives, and advantages thereof, will best be understood by reference to the following detailed description of an illustrative embodiment when read in conjunction with the accompanying drawings, wherein:

FIG. 1 displays a perspective view of a system for trailer attachment in accordance with embodiments.

DETAILED DESCRIPTION OF THE SPECIFIC EMBODIMENTS

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
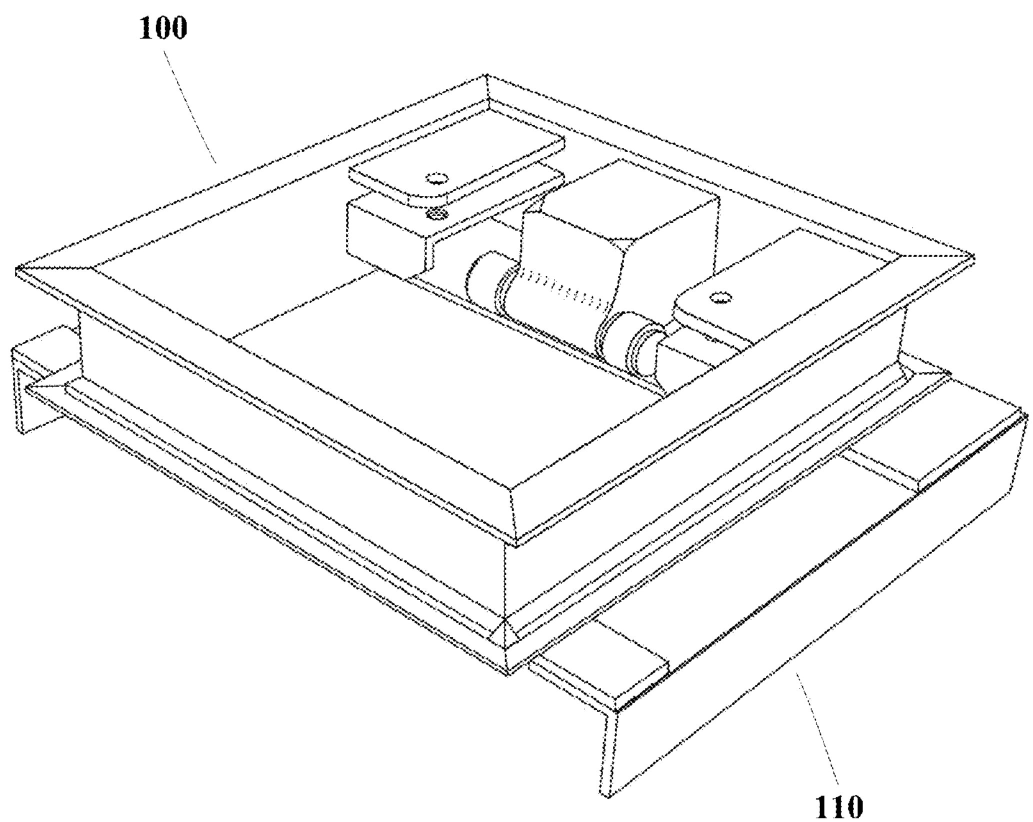

FIG. 1 displays a perspective view of a system for trailer attachment in accordance with embodiments. The system may comprise a substantially rectangular frame structure 100 comprising a closed bottom interior section. In embodiments, the frame structure 100 may be affixed to at least a portion of a towing vehicle frame. In embodiments, the substantially rectangular frame 100 may be affixed at a position below a bed of the towing vehicle. In embodiments, the substantially rectangular frame 100 may be welded to the towing vehicle frame. In embodiments, the substantially rectangular frame structure 100 may be bolted to a truck frame. In embodiments, a lower frame 110 may be welded to at least a portion of the substantially rectangular frame structure 100. In embodiments, the lower frame 110 may be bolted to a truck frame. In embodiments, the substantially rectangular frame structure 100 may comprise at least one interior wall. In embodiments, the substantially rectangular frame structure 100 may comprise four interior walls.

Figure 2:
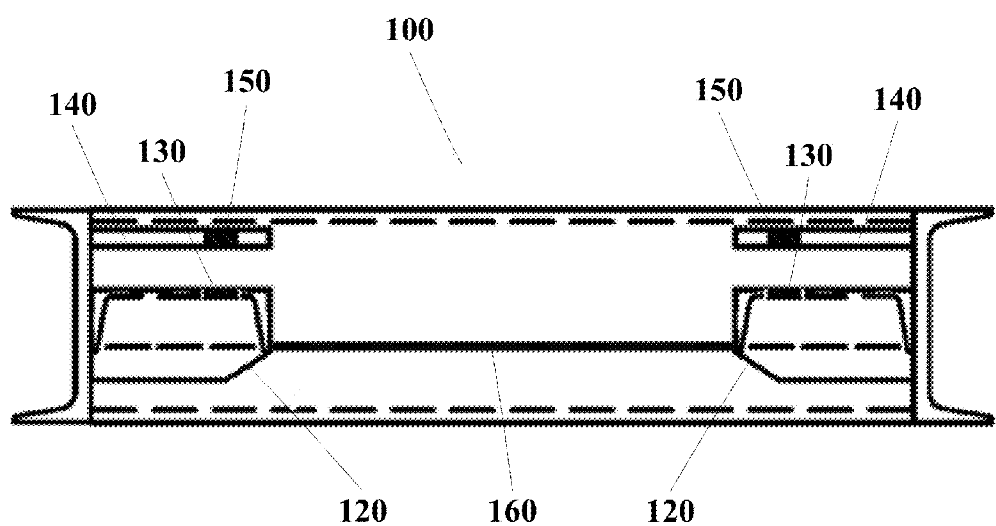
FIG. 2 depicts a side schematic view of a system for trailer attachment in accordance with embodiments.

FIG. 2 depicts a side schematic view of a system for trailer attachment in accordance with embodiments. The system may further comprise at least two shelving elements 120 affixed to at least two interior walls of the substantially rectangular frame structure 100. In embodiments, the at least two shelving elements 120 may be spaced a distance from the bottom of the interior section of the substantially rectangular frame structure 100. In embodiments, the at least two shelving elements 120 may comprise at least one orifice 130.

At least two upper retaining elements 140 may be affixed to at least two interior walls of the substantially rectangular frame structure 100. In embodiments, the at least two upper retaining elements 140 may be spaced a distance from the at least two shelving elements 120. In embodiments, the at least two upper retaining elements 140 may each comprise at least one orifice 150. A platform 160 may comprise a top surface and a bottom surface. At least a portion of the platform 160 (denoted with a solid line and dotted lines) may be encompassed between the at least two shelving elements 120 and the bottom interior surface of the substantially rectangular frame structure 100.

Figure 3A:
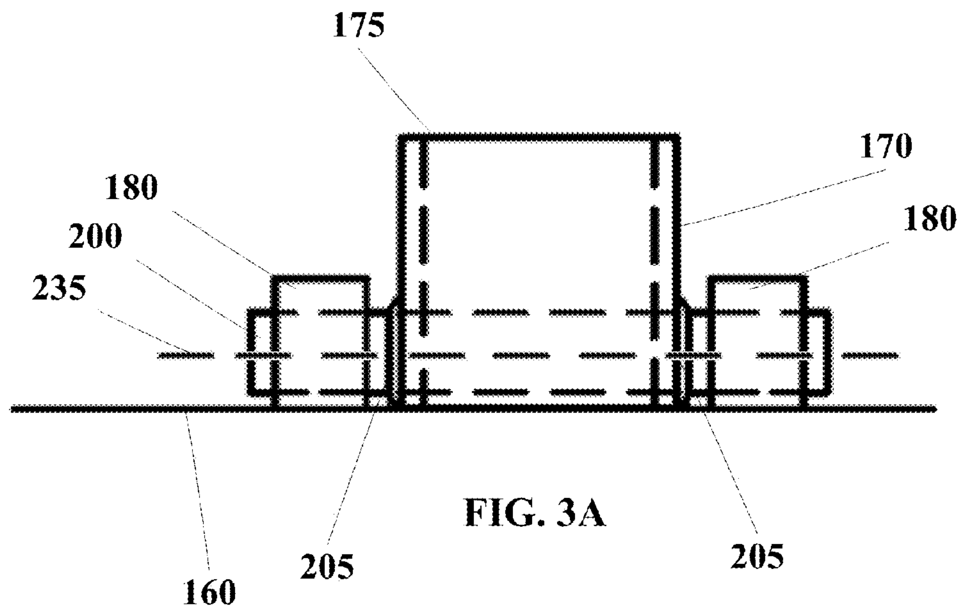
FIG. 3A depicts a front schematic view of a hitch base portion of a system for trailer attachment in accordance with embodiments.

FIG. 3A depicts a front schematic view of a hitch base portion of a system for trailer attachment in accordance with embodiments. At least two pin collars 180 may be affixed to platform 160 and may each comprise hollow interior portions. A hitch base portion 170 may be pivotable about a pivot axis and may comprise a hollow interior portion. In embodiments, a pivot pin 200 may be rotatable within a portion of at least two of the hollow interior portions of the at least two pin collars 180 and the hitch base portion 170 (see FIG. 3B) of each of the at least two pin collars 180 and the hitch base portion 170. In embodiments, a fifth wheel hitch may be welded to the hitch base portion 170. In embodiments, the hitch base portion 170 may be within a plane of symmetry perpendicular to a plane of symmetry of the frame structure 100 when the hitch base portion 170 is in an upright position. In embodiments, a portion of the hitch portion 170 may be greater in height than the bed of a towing vehicle when in the upright position. In embodiments, the hitch portion 170 may be lesser in height than the bed of a towing vehicle when in the lowered position. This may allow for a trap door built into the bed of the truck to close over and cover the hitch portion 170 when in the lowered position. In embodiments, the fifth wheel hitch may comprise dual swivel-ability. For example, the fifth wheel hitch may swivel side-to-side and back-and-forth. In embodiments, the fifth wheel hitch may comprise single swivel-ability. In embodiments, the hitch base portion 170 may comprise a hitch platform 175 affixed to a top portion of the hitch base portion 170. In embodiments, the hitch platform 175 may be affixed to the hitch base portion 170 via welding. In embodiments, a fifth wheel hitch may be welded to the hitch platform 175. In embodiments, the hitch base portion 170 may comprise a range of motion greater than 90 degrees when affixed within the system. In embodiments, the system may further comprise clamp elements 205 that may be installed on the pivot pin 200, wherein the pivot pin 200 may be slid through the hollow interior portions of the at least two pin collars 180, the hollow interior portion of the hitch base portion 170, and an interior surface of the clamp elements. In embodiments, the clamp elements 205 may each be found between a pin collar 180 and the hitch base portion 170 while also existing around the pivot pin 200. In embodiments, the clamp elements 205 may cause an increase in friction to reduce the sliding of the pivot pin 200 along the pivot axis. In embodiments (such as the embodiment shown in FIG. 3B), the hitch base portion 170 may be rounded on the side where the hitch base portion 170 is folded down (pivots) so that the hitch base portion 170 is not restricted from pivoting.

FIG. 3A further displays a pivot axis 235. The pivot axis 235 may run through the pivot pin 200. In embodiments, the hitch base portion 170 may rotate about the pivot axis 235 in the direction of the arrow found in FIG. 3B depending on where the hitch base portion 170 is being moved from and to (in a direction circumnavigating the pivot pin 200). The hitch base portion 170 may rotate about the pivot axis 235 in the opposite direction of the arrow found in FIG. 3B depending on where the hitch base portion 170 is being moved from and to (also in a direction circumnavigating the pivot pin 200).

Figure 5:
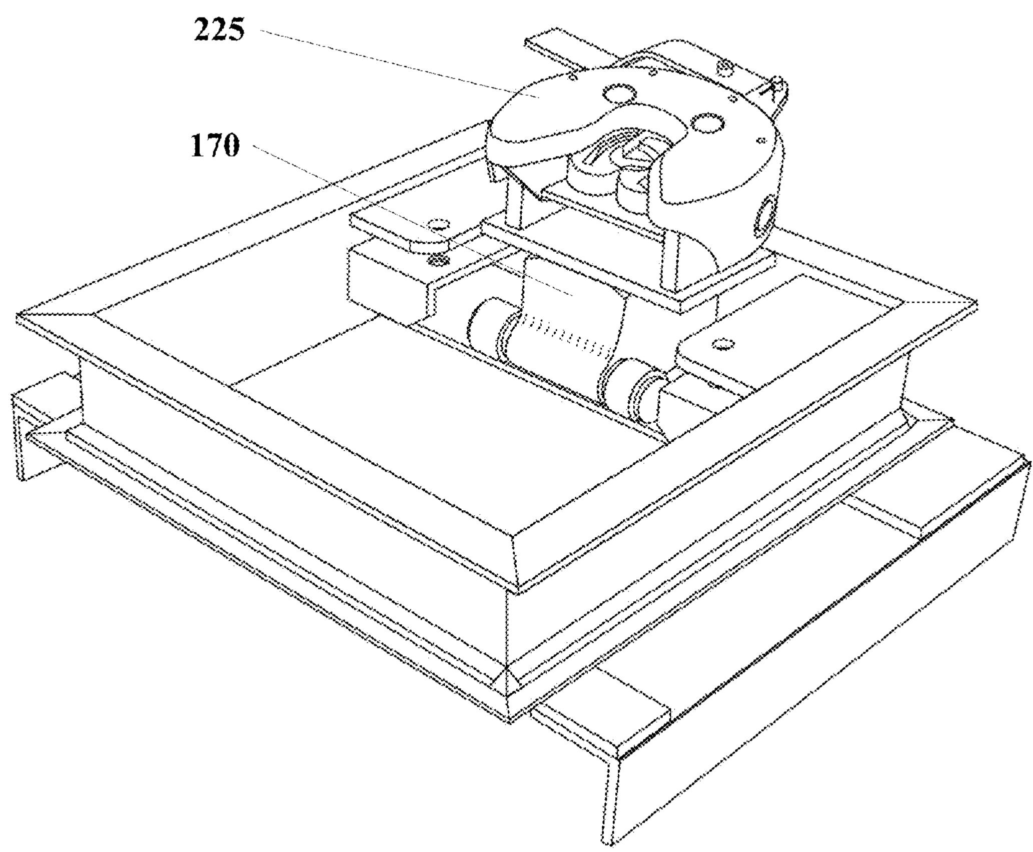
FIG. 5 depicts a perspective view of a system for trailer attachment with a fifth wheel hitch in accordance with embodiments.

In embodiments, the hitch base portion 170 may comprise a top side and a bottom side that may exist on opposite sides of the hitch base portion 170. In embodiments, the top side of the hitch base portion 170 may receive the fifth wheel hitch 225 (FIG. 5). In embodiments, the bottom side of the fifth wheel hitch 170 may exist adjacent to the platform 160 when the hitch base portion 170 is in the upright position. In embodiments, the bottom side of the fifth wheel hitch 170 may exist adjacent to the platform 160 and may be in at least partial contacting relationship with the platform 160 when the hitch base portion 170 is in the upright position.

In embodiments, the bottom side of the hitch base portion 170 and/or the fifth wheel hitch 225 may exist in at least partial contacting relationship with the platform 160 when the hitch base portion 170 is in the upright position and engaged and retained by the lock bar 220. In embodiments, the hitch base portion 170 and/or the fifth wheel hitch 225 may exist in at least partial contacting relationship with an interior wall of the substantially rectangular frame structure

100 when the hitch base portion 170 is in the upright position and engaged and retained by the lock bar 220. In embodiments, at least the bottom side of the hitch base portion 170 and/or the fifth wheel hitch 225 may exist in at least partial contacting relationship with both the platform 160 and an interior wall of the substantially rectangular frame structure 100 when the hitch base portion 170 is in the upright position and engaged and retained by the lock bar 220.

In embodiments, the bottom side of the hitch base portion 170 may exist in at least partial contacting relationship with the platform 160 when the hitch base portion 170 is in the upright position. In embodiments, the hitch base portion 170 and/or the fifth wheel hitch 225 may exist in at least partial contacting relationship with an interior wall of the substantially rectangular frame structure 100 when the hitch base portion 170 is in the upright position. In embodiments, at least the bottom side of the hitch base portion 170 may exist in at least partial contacting relationship with both the platform 160 and an interior wall of the substantially rectangular frame structure 100 when the hitch base portion 170 is in the upright position.

In embodiments, the hitch base portion 170 and/or the fifth wheel hitch 225 may exist in at least partial contacting relationship with the closed bottom of the substantially rectangular frame structure 100 when the hitch base portion 170 is in a lowered position. In embodiments, the hitch base portion 170 and/or the fifth wheel hitch 225 may not exist in at least partial contacting relationship with the closed bottom of the substantially rectangular frame structure 100 when the hitch base portion 170 is in a lowered position.

In embodiments, the pivot pin 200 may be affixed (via welding, etc.) to the hollow interior portion of the hitch base portion 170. In embodiments, the pivot pin 200 may be rotatable within the at least two pin collars 180. In embodiments, the pivot pin 200 may be affixed (via welding, etc) to the hollow interior portions of the at least two pin collars 180. In embodiments, the pivot pin may be rotatable within the hollow interior portion of the hitch base portion 170. In embodiments, the hollow interior portion of the hitch base portion 170 may be form fitted to at least a portion of the pivot pin 200. In embodiments, the hollow interior portions of the at least two pin collars 180 may be form fitted to at least a portion of the pivot pin 200.

Figure 3B:
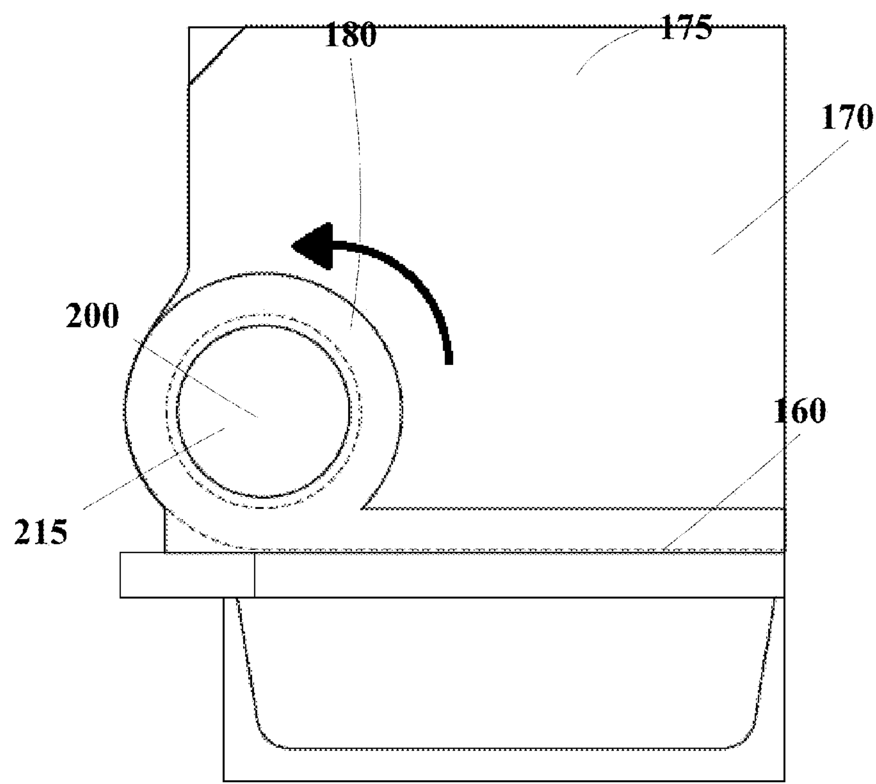
FIG. 3B depicts a side schematic view of a hitch base portion of a system for trailer attachment in accordance with embodiments.

As shown in FIG. 3B, the hollow interior portion of the hitch base portion 170 may be denoted with a circular dotted line in embodiments.

Figure 4A:
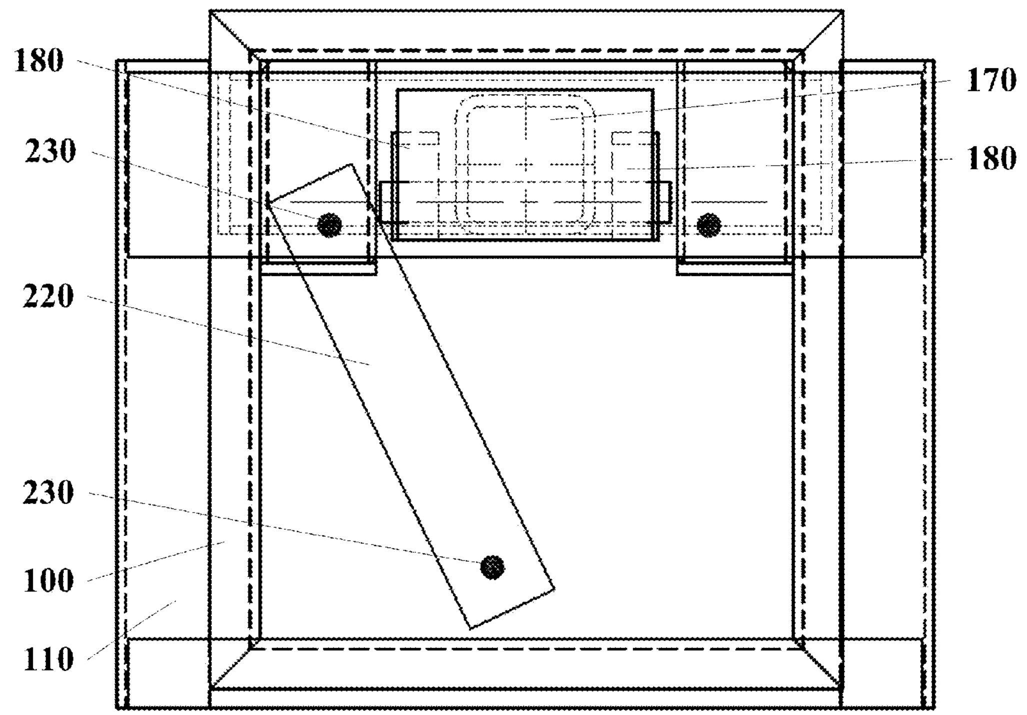
FIG. 4A depicts a top schematic view of a system for trailer attachment with an open lock bar in accordance with embodiments.
Figure 4B:
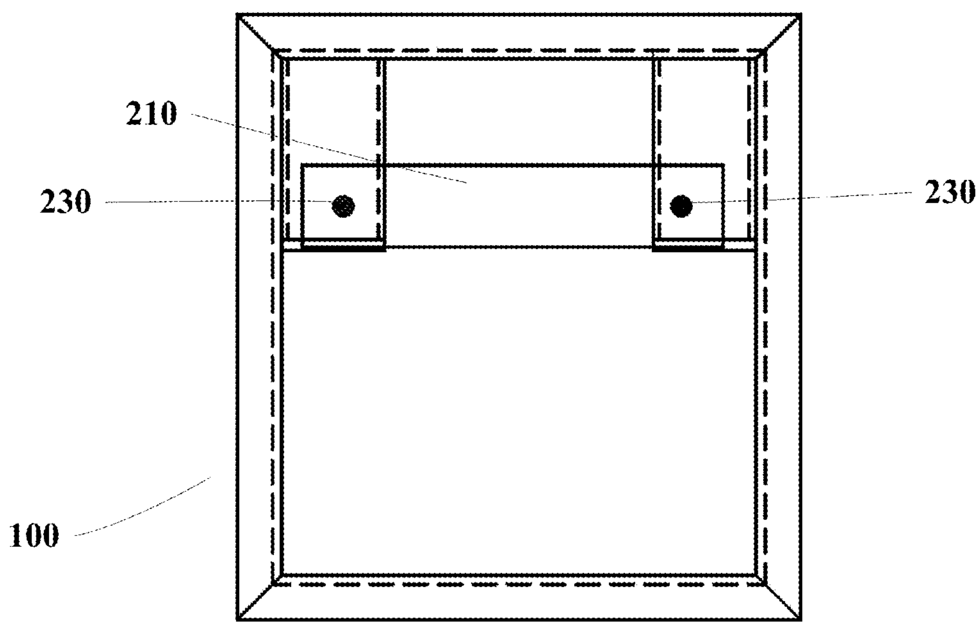
FIG. 4B depicts a top schematic view of a system for trailer attachment with a closed lock bar in accordance with embodiments.

FIG. 4A depicts a top schematic view of a system for trailer attachment with an open lock bar 220 in accordance with embodiments. FIG. 4B depicts a top schematic view of a system for trailer attachment with a closed lock bar 210 in accordance with embodiments. A lock bar 210,220 may be slidably engageable within the distance between the shelving elements 120 and the upper retaining elements 140. In embodiments, the lock bar 210,220 may comprise at least two orifices 230. In embodiments, the lock bar 210,220 may be able to "swing open" by having one side of the lock bar 210,220 fixed to at least one of the shelving element 120 and the upper retaining element 140 via a locking element. The locking element, such as a bolt, may be positioned within one of the orifices of each of the shelving element 120, the upper retaining element 140, and the lock bar 210,220 in order to retain one side of the lock bar 210,220. The second orifices of each of the shelving element 120, the upper retaining element 140, and the lock bar 210,220 may not contain an element so that the other side of the lock bar 210,220 may not be retained in place so that the lock bar 210,220 may be allowed to be positioned in an open position. In embodiments, the hitch base portion 170 may be in a lowered position when not engaged and retained by the open lock bar 220 found in FIG. 4A. In embodiments, the locking element may be permanently affixed within the orifices of each of the shelving element 120, the upper retaining element 140, and the lock bar 210,220. In embodiments, the locking element may be a bolted pin.

As found in FIG. 4B, a second locking element may be partially encompassed within the other of the orifices 130, 150,230 of the upper retaining elements 140, the shelving elements 120, and the lock bar 210. In embodiments, the hitch base portion 170 may be in an upright position when engaged and retained by the closed lock bar 210 found in FIG. 4B. In embodiments, the second locking element may be a drop pin. In embodiments, the second locking element may be a bolted pin.

Figure 6A:
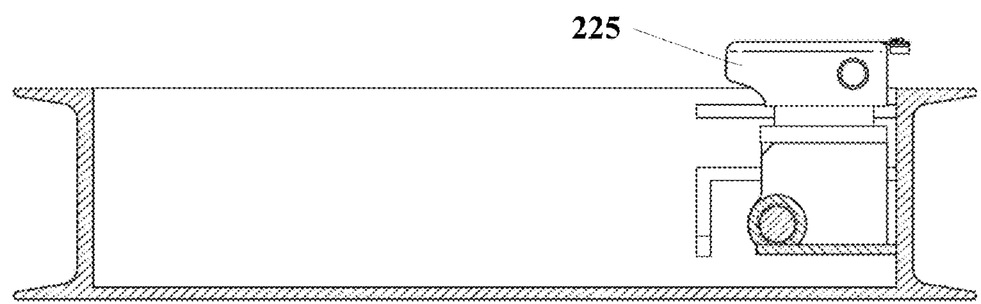
FIG. 6A depicts a side schematic view of a system for trailer attachment with a fifth wheel hitch in an upright position in accordance with embodiments.
Figure 6B:
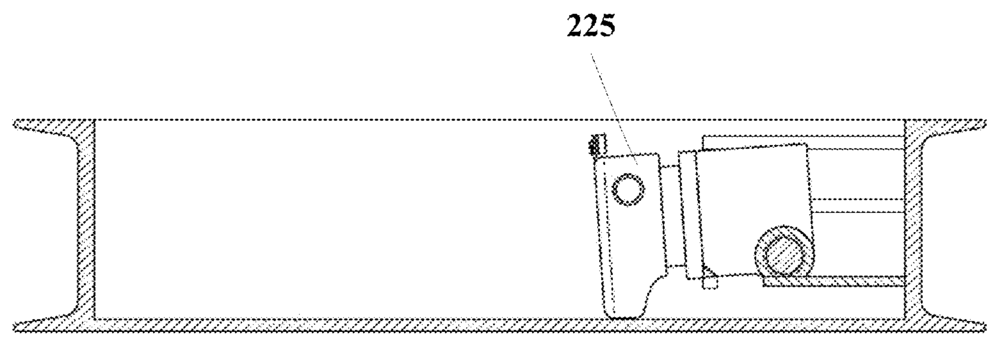
FIG. 6B depicts a side schematic view of a system for trailer attachment with a fifth wheel hitch in a lowered position in accordance with embodiments.

FIG. 5 depicts a perspective view of a system for trailer attachment with a fifth wheel hitch 225 in accordance with embodiments. The fifth wheel hitch 225 may be affixed to at least a portion of the hitch platform 175 of the hitch base portion 170. In embodiments, the fifth wheel hitch 225 may be welded to at least a portion of the hitch platform 175. The fifth wheel hitch 225 may be moved in response to the combination of the hitch base portion 170 and the pivot pin 200 acting in pivoting engagement. FIG. 6A depicts a side schematic view of a system for trailer attachment with a fifth wheel hitch 225 in an upright position in accordance with embodiments. When the fifth wheel hitch 225 is in use, the fifth wheel hitch 225 may be in the upright position in order to be able to receive a trailer kingpin, in embodiments. FIG. 6B depicts a side schematic view of a system for trailer attachment with a fifth wheel hitch 225 in a lowered position in accordance with embodiments. When the fifth wheel hitch 225 is in use, the fifth wheel hitch 225 may be in the lowered position in order to be able to be stowed within the bed of a truck. In embodiments, when the fifth wheel hitch 225 is in the lowered position, the fifth wheel hitch 225 may allow enough space for a trap door to close over the entire system for trailer attachment.

In embodiments, the closed bottom of the substantially rectangular frame structure 100 may comprise a protector element that may receive at least a portion of the hitch base portion 170 and/or the fifth wheel hitch 225 when in the lowered position so that the closed bottom may be protected from impact, scratching, etc. by the hitch base portion 170 and/or the fifth wheel hitch 225. The protector element may be made of any suitable material in order to protect the closed bottom from impact, scratching, etc., such as, but not limited to silicone, polymer, and wood. In embodiments, the protector element may comprise an adhesive element that may allow the protector element to affix to the closed bottom. In embodiments, the protector element may be affixed to the closed bottom by means other than an adhesive, such as, but not limited to bolts and welds.

Figure 7:
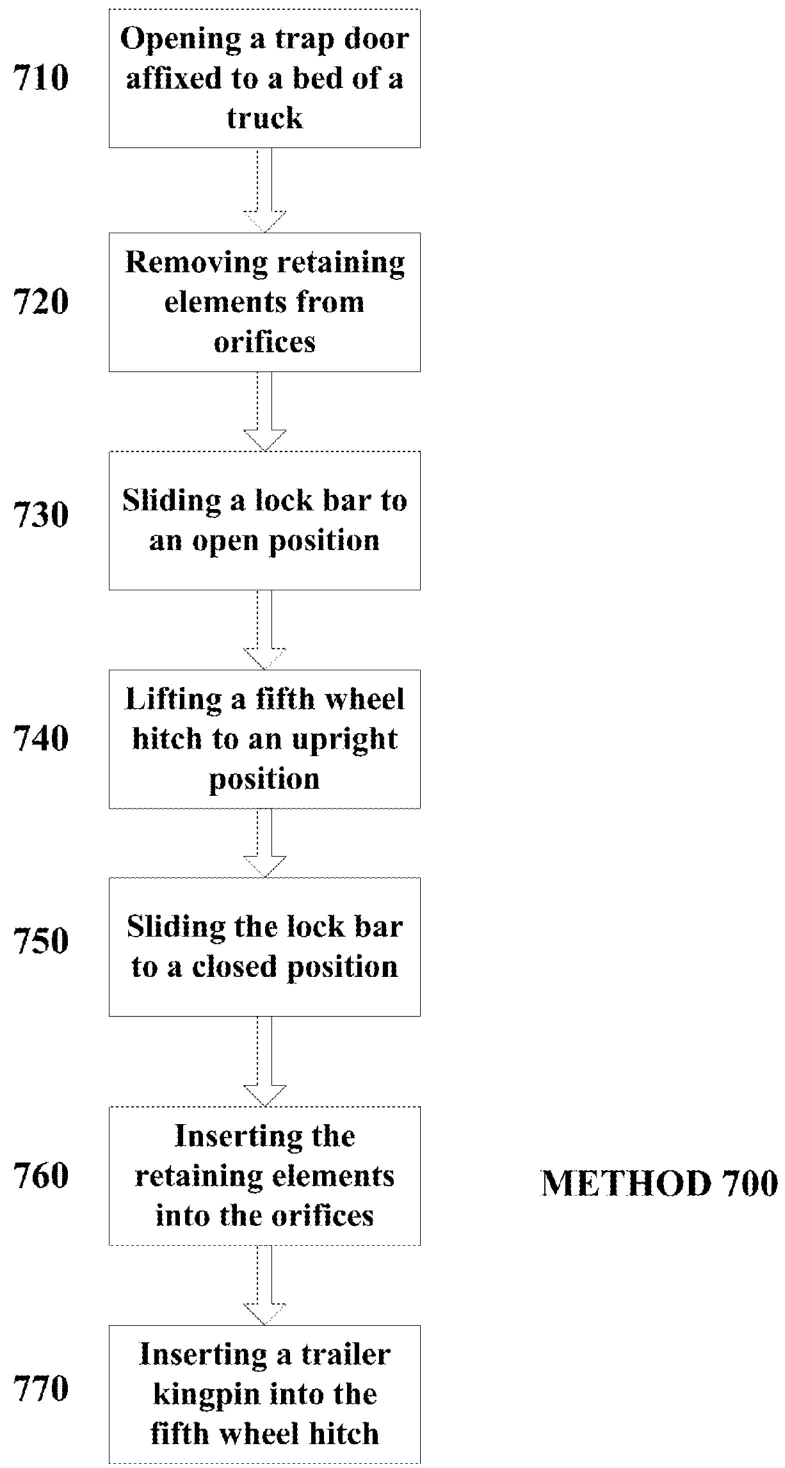
FIG. 7 depicts a method for trailer attachment in accordance with embodiments.

The disclosure may further comprise a method 700 for affixing a trailer to a hitch when the hitch is stowed away in the bed of a truck, as found in FIG. 7. Method 700 may comprise opening 710 a trap door affixed to a bed of a truck and removing 720 at least one locking element from at least one orifice 130,150,230 found in at least two shelving elements 120, at least two upper retaining elements 140, at least two orifices found in a lock bar 210,220 (wherein the one or more locking elements may keep the lock bar 210,220 in place). Method 700 may further comprise sliding 730 the lock bar 210,220 to an open position once the at least one locking element has been removed. A fifth wheel hitch welded to a hitch base portion 170 may then be lifted 740 to an upright position. Once the fifth wheel hitch is in an upright position, the open lock bar 220 may be slid 750 to a closed position. The locking elements removed from the orifices 130,150,230 may then be re-inserted (inserted) 760 into the orifices 130,150,230 found in the at least two shelving elements 120, the at least two upper retaining elements 140, and the lock bar 210,220. A trailer kingpin may then be inserted 770 into the fifth wheel hitch.

In embodiments, a majority of the elements of the system for trailer attachment may be affixed to other elements of the system for trailer attachment via welding.

Figure 8:
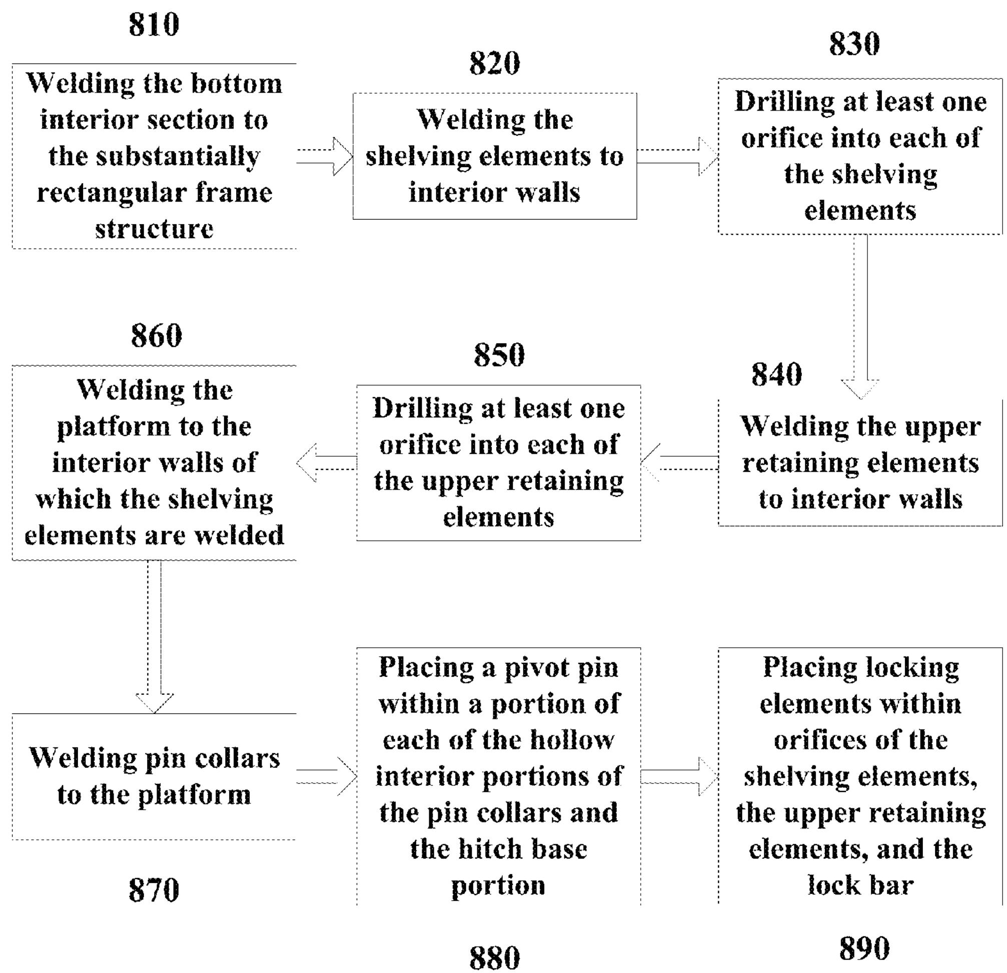
FIG. 8 depicts a method for fabrication of a system for trailer attachment in accordance with embodiments.

The disclosure may further provide a method 800 for fabrication of the system, as found in FIG. 8. Method 800 may comprise welding 810 the bottom interior section to the substantially rectangular frame structure 100. In embodiments, the bottom interior section may be thinner than the rest of the substantially rectangular frame structure 100. The at least two shelving elements 120 may be welded 820 to the at least two interior walls. At least one orifice 130 may be drilled 830 into each of the at least two shelving elements. The at least two upper retaining elements 140 may be welded 840 to the at least two interior walls. At least one orifice 150 may be drilled 850 into each of the at least two upper retaining elements 140.

Method 800 may further comprise welding 860 the platform 160 to the at least two interior walls of which the at least two shelving elements 120 are welded. At least two pin collars 180 may be welded 870 to the platform 160. A pivot pin 200 may be placed 880 within a portion of each of the hollow interior portions of the at least two pin collars 180 and the hollow interior portion of a hitch base portion 170. At least one of a plurality of locking elements may be placed 890 within at least one of the at least one shelving element orifices 130, at least one of the at least one upper retaining element orifices 150, and at least one of the at least two orifices 230 of the lock bar 210,220 in order to at least partially retain the lock bar 210,220.

The steps of the aforementioned methods 700,800 may be performed in any suitable order and are not limited by the order in which the steps are presented.

In embodiments, elements of the present disclosure may be welded to one another via stick welding. In embodiments, elements of the present disclosure may be welded to one another via mig welding.

In embodiments, a fifth wheel hitch 225 utilized by the system for trailer attachment may be the Holland Mini Fifth Wheel Hitch made by SAF-HOLLAND USA, Inc. In embodiments, the fifth wheel hitch 225 may perform similarly to any other conventional fifth wheel hitch.

The foregoing description of the preferred embodiments is provided to enable a person skilled in the art to make or use the claimed subject matter. Various modifications to these embodiments, including changing point values and/or adding or deleting point opportunities, will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

The detailed description set forth herein in connection with the appended drawings is intended as a description of exemplary embodiments in which the presently disclosed apparatus and system can be practiced. The term "exemplary" used throughout this description means "serving as an example, instance, or illustration," and should not necessarily be construed as preferred or advantageous over other embodiments.

Further, although exemplary devices and figures to implement the elements of the disclosed subject matter have been provided, one skilled in the art, using this disclosure, could develop additional hardware and/or software to practice the disclosed subject matter and each is intended to be included herein.

In addition to the above described embodiments, those skilled in the art will appreciate that this disclosure has application in a variety of arts and situations and this disclosure is intended to include the same.

The invention claimed is:

1. A method for fabricating a system for trailer attachment to a towing vehicle, the method comprising:

welding a bottom interior section to a substantially rectangular frame structure;

welding at least two shelving elements to at least two interior walls of a substantially rectangular frame;

drilling at least one orifice into each of the at least two shelving elements;

welding a platform to the at least two interior walls of the substantially rectangular frame to which the at least two shelving elements are welded;

welding at least two pin collars to the platform;

placing a pivot pin within a portion of each of the hollow interior portions of the at least two pin collars and a hollow interior portion of a hitch base portion;

positioning a lock bar on top of the at least two shelving elements, the lock bar comprising at least two orifices; and placing at least one of a plurality of locking elements within at least one of the at least one shelving element orifices and at least one of the at least two orifices of the lock bar in order to at least partially retain the lock bar.

2. The system of claim 1, further comprising welding a fifth wheel hitch to a hitch platform of the hitch base portion.

3. The method of claim 1, further comprising welding at least two upper retaining elements to the at least two interior walls.

4. The method of claim 3, further comprising forming at least one orifice into each of the at least two upper retaining elements, the at least one orifice of each upper retaining element aligning with the at least one orifice of each at least two shelving elements.

5. The method of claim 4, further comprising placing the at least one of a plurality of locking elements within the at least one of the at least one shelving element orifices, at least one of the at least one upper retaining element orifices, and the at least one of the at least two orifices of the lock bar in order to at least partially retain the lock bar.

6. The method of claim 1, further comprising welding a lower frame to at least a portion of the rectangular frame structure.

7. The method of claim 6, further comprising bolting the lower frame to a towing vehicle frame.

8. The method of claim 1, further comprising affixing the substantially rectangular frame at a position below a bed of a towing vehicle.

* * * * *